(12) United States Patent
Haraguchi et al.

(10) Patent No.: US 10,272,965 B2
(45) Date of Patent: Apr. 30, 2019

(54) SADDLED-VEHICLE COWL STRUCTURE

(71) Applicant: HONDA MOTOR CO., LTD., Minato-ku, Tokyo (JP)

(72) Inventors: Hideaki Haraguchi, Wako (JP); Shin Yokoyama, Wako (JP); Takayoshi Tsujinaka, Wako (JP); Hiroki Mori, Wako (JP); Hiroaki Takashiba, Wako (JP); Masahiro Mizoguchi, Wako (JP); Kazuro Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/565,852

(22) PCT Filed: Apr. 24, 2015

(86) PCT No.: PCT/JP2015/062590
§ 371 (c)(1),
(2) Date: Oct. 11, 2017

(87) PCT Pub. No.: WO2016/170689
PCT Pub. Date: Oct. 27, 2016

(65) Prior Publication Data
US 2018/0118295 A1    May 3, 2018

(51) Int. Cl.
*B62J 17/02* (2006.01)
*B60K 13/02* (2006.01)

(52) U.S. Cl.
CPC .............. *B62J 17/02* (2013.01); *B60K 13/02* (2013.01)

(58) Field of Classification Search
CPC ............ B62J 17/02; B62J 17/00; B60K 13/02
See application file for complete search history.

(56) References Cited

U.S. PATENT DOCUMENTS

| 4,830,135 A | 5/1989 | Yamashita |
| 5,301,767 A * | 4/1994 | Shiohara ................ B60K 13/06 180/219 |

(Continued)

FOREIGN PATENT DOCUMENTS

| CN | 1740550 A | 3/2006 |
| CN | 101187331 A | 5/2008 |

(Continued)

OTHER PUBLICATIONS

PCT/ISA/210 from PCT/JP2015/062590 with the English translation thereof.

(Continued)

*Primary Examiner* — Joseph M Rocca
*Assistant Examiner* — Michael R Stabley
(74) *Attorney, Agent, or Firm* — Carrier Blackman & Associates, P.C.; William D. Blackman; Joseph P. Carrier

(57) ABSTRACT

Provided is a saddled-vehicle cowl structure capable of effectively supplying outside air to a power unit. A saddled-vehicle cowl structure includes a main seat on which an occupant is seated, a side cowl that covers a side lower part of the main seat, an air cleaner box provided below the main seat and connected to a power unit, and an air intake duct for supplying outdoor air to the air cleaner box. The side cowl includes an inner side cowl and an outer side cowl disposed on a vehicle width direction outer side of the inner side cowl. An air intake port for supplying traveling wind to the air intake duct is provided near a front end portion of the inner side cowl. The air intake port is covered by the outer side cowl from an outer side.

4 Claims, 12 Drawing Sheets

(56) References Cited

U.S. PATENT DOCUMENTS

| | | | | |
|---|---|---|---|---|
| 5,577,570 | A | * | 11/1996 | Shiohara ............ B60K 13/02 180/219 |
| 8,083,017 | B2 | * | 12/2011 | Arimura ............. B62J 17/02 180/219 |
| 8,881,859 | B2 | * | 11/2014 | Nakamura ........... B62J 17/02 180/229 |
| 8,936,123 | B2 | * | 1/2015 | Kogo ............... B60Q 1/0433 180/219 |
| 9,815,503 | B2 | * | 11/2017 | Tsukui ............... B60K 11/08 |
| 2006/0037585 | A1 | | 2/2006 | Imamura |
| 2006/0283647 | A1 | | 12/2006 | Seki et al. |
| 2008/0121449 | A1 | | 5/2008 | Fujimura |
| 2012/0043150 | A1 | | 2/2012 | Miyazaki et al. |
| 2013/0240276 | A1 | | 9/2013 | Matsushima et al. |
| 2015/0083513 | A1 | | 3/2015 | Ito et al. |

FOREIGN PATENT DOCUMENTS

| | | |
|---|---|---|
| CN | 104454133 A | 3/2015 |
| JP | 2006-347343 A | 12/2006 |
| JP | 2010-162990 A | 7/2010 |
| JP | 2011-161997 A | 8/2011 |
| JP | 2012-162094 A | 8/2012 |
| JP | 2012-240522 A | 12/2012 |
| JP | 2013-189171 A | 9/2013 |
| JP | 2014-125012 A | 7/2014 |

OTHER PUBLICATIONS

Taiwanese Office Action, dated Dec. 23, 2016, issued in the corresponding Taiwanese Patent Application No. 105112106.

Extended European search report dated May 2, 2018 issued in the corresponding EP Patent Application 15889928.6.

PCT/IB/326, PCT/IB/373 and PCT/IB/338 with PCT/ISA/237, The International Preliminary Report on Patentability, from International Application PCT/JP2015/062590 and the English translation thereof.

Office Action dated Jun. 26, 2018 in the corresponding Japanese Patent Application No. 2017-513941 with the English machine translation thereof.

* cited by examiner

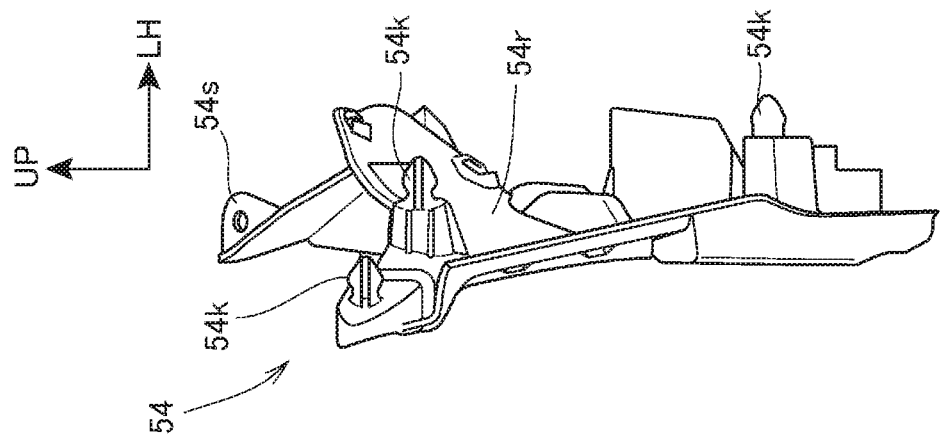
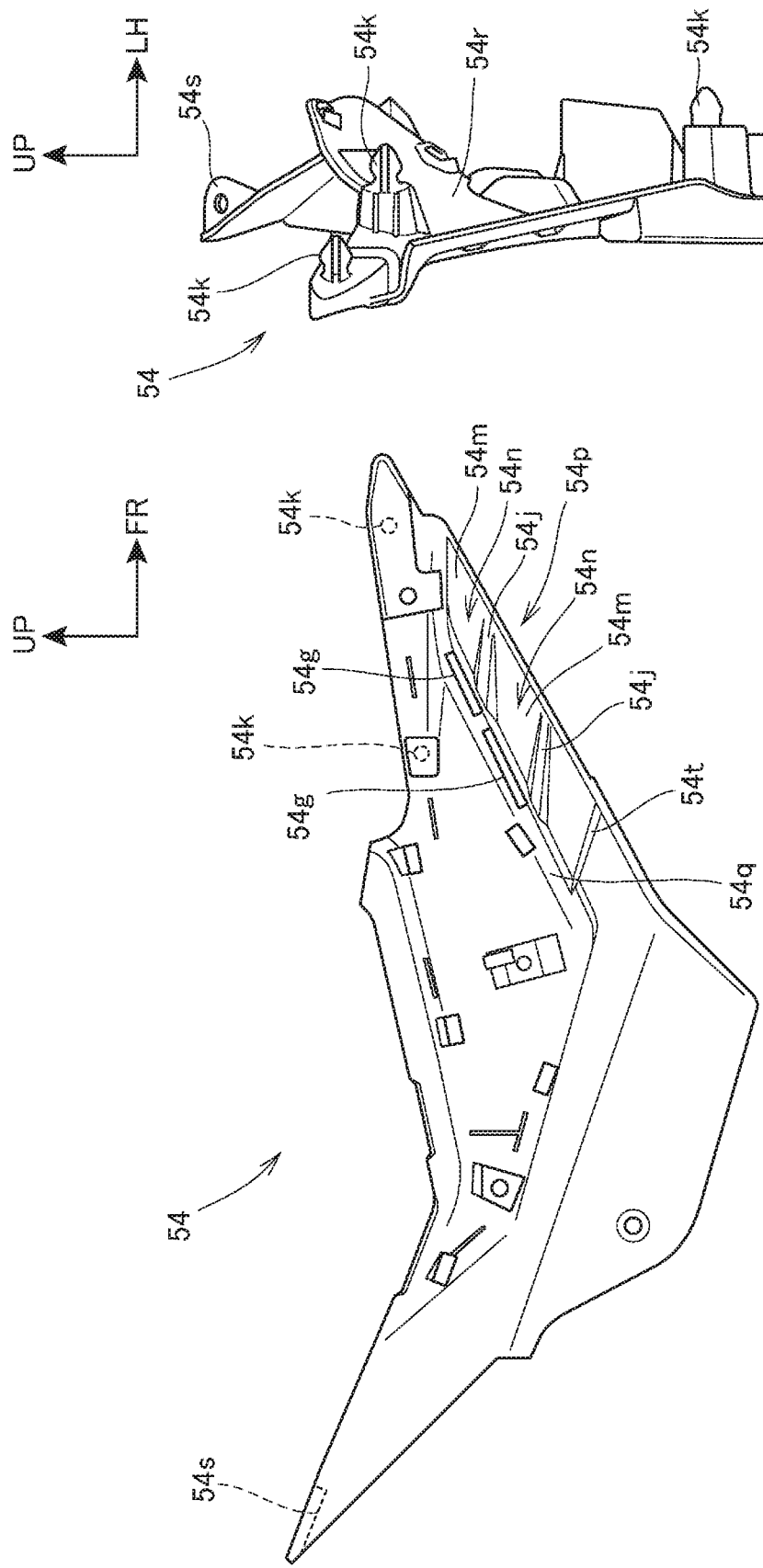

SADDLED-VEHICLE COWL STRUCTURE

TECHNICAL FIELD

The present invention relates to a saddled-vehicle cowl structure for supplying outside air to a power unit.

BACKGROUND ART

There has been known a structure in which an opening of an air intake duct is formed in a vehicle body front surface center, an opening is provided in a middle cowl that covers a vehicle body side, and a radiator is exposed to a lot of traveling wind (see, for example, Patent Literature 1).

CITATION LIST

Patent Literature

Patent Literature 1: Japanese Patent Laid-Open No. 2006-347343

SUMMARY OF INVENTION

Technical Problem

In the case of the middle cowl in Patent Literature 1, the middle cowl has a shape formed by calculating how the traveling wind passes by providing the opening. However, a cowl structure for taking the traveling wind into a vehicle body is not formed. It is desired to more effectively utilize the traveling wind.

An object of the present invention is to provide a saddled-vehicle cowl structure capable of effectively supplying outside air to a power unit.

Solution to Problem

In order to solve the problem, the present invention provides a saddled-vehicle cowl structure including: a handle (21) steerably supported by a head pipe (10b); a seat (17) on which an occupant is seated; a side cowl (33) that covers a side lower part of the seat (17); an air cleaner box (37) provided below the seat (17) and connected to a power unit (30); and an air intake duct (38) for supplying outdoor air to the air cleaner box (37). The side cowl (33) includes an inner side cowl (54) and an outer side cowl (55) disposed on a vehicle width direction outer side of the inner side cowl (54). An air intake port (54g) for supplying traveling wind to the air intake duct (38) is provided near a front end portion of the inner side cowl (54). The air intake port (54g) is covered by the outer side cowl (55) from an outer side.

In the configuration, the inner side cowl (54) may include a protrusion section (54j) projecting to the outer side. The protrusion section (54j) may be provided in a front of the air intake port (54g) from a vehicle width direction inner side of a front end portion of the outer side cowl (55) to a part where the inner side cowl (54) is exposed to an outside.

In the configuration, a side of the head pipe (10b) may be covered by the middle cowl (42). An air intake passage (42b) may be formed on an inside of the middle cowl (42). A rear edge of the middle cowl (42) may be disposed on a front side of the air intake port (54g) and further on an outer side than the air intake port (54g). The traveling wind passed through the air intake passage (42b) may be supplied to the air intake duct (38) via the air intake port (54g).

In the configuration, a main frame (10c) may extend rearwardly downward from the head pipe (10b). A fuel tank (29) for supplying fuel to the power unit (30) may be provided between the head pipe (10b) and the seat (17). The inner side cowl (54) may be disposed above the main frame (10c) and supported by the fuel tank (29). The middle cowl (42) may be supported by a stay (91) extending sideward from the main frame (10c).

Advantageous Effects of Invention

The side cowl of the present invention includes the inner side cowl and the outer side cowl disposed on the vehicle width direction outer side of the inner side cowl. The air intake port for supplying the traveling wind to the air intake duct is provided near the front end portion of the inner side cowl. The air intake port is covered from the outer side by the outer side cowl. Therefore, it is possible to prevent the air intake port from being closed by a leg when the occupant performs knee-grip. Therefore, it is possible effectively supply the outside air to the power unit.

The inner side cowl includes the protrusion section projecting to the outer side. The protrusion section is provided in the front of the air intake port from the vehicle width direction inner side of the front end portion of the outer side cowl to the part where the inner side cowl is exposed to the outside. Therefore, unevenness is formed on the outer side surface of the inner side cowl. It is possible to prevent the air intake port from being completely closed when the occupant performs the knee-grip. Therefore, it is possible to effectively supply the outside air to the power unit.

The side of the head pipe is covered by the middle cowl. The air intake passage is formed on the inside of the middle cowl. The rear edge of the middle cowl is disposed on the front side of the air intake port and further on the outer side than the air intake port. The traveling wind passed through the air intake passage is supplied to the air intake duct via the air intake port. Therefore, by disposing the rear edge of the middle cowl on the front side and the outer side of the air intake port, it is possible to secure a space in the front of the side cowl when the occupant places the leg on the middle cowl in order to perform the knee-grip. Consequently, it is possible to effectively supply the outside air to the power unit.

The main frame extends rearwardly downward from the head pipe. The fuel tank for supplying the fuel to the power unit is provided between the head pipe and the seat. The inner side cowl is disposed above the main frame and supported by the fuel tank. The middle cowl is supported by the stay extending sideward from the main frame. Therefore, since the inner side cowl and the middle cowl are supported in a state in which the inner side cowl and the middle cowl are offset in the vehicle width direction, it is possible to form a structure in which the air intake port is much less easily closed by the knee-grip of the occupant. Therefore, the occupant can perform the knee-grip in a state in which a space in the side cowl front is secured. It is possible to effectively supply the outside air to the power unit. The inner side cowl is supported by the fuel tank. The middle cowl is supported by the main frame via the stay. Therefore, it is possible to firmly support the inner side cowl and the middle cowl.

BRIEF DESCRIPTION OF THE DRAWINGS

FIGS. 10A and 10B are explanatory diagrams showing an inner side cowl, wherein FIG. 10A is a side view of the inner side cowl and FIG. 10B is a front view of the inner side cowl.

FIGS. 11A and 11B are explanatory diagrams showing an inner middle cowl and an outer middle cowl of the middle cowl, wherein FIG. 11A is a side view showing the inner middle cowl and FIG. 11B is a side view showing the outer middle cowl.

DESCRIPTION OF EMBODIMENTS

An embodiment of the present invention is explained below with reference to the drawings. Note that, in the explanation, descriptions of directions such as front, rear, left, and right and upward and downward are the same as directions with respect to a vehicle body unless particularly described otherwise. A sign FR shown in the figures indicates a vehicle body forward direction, a sign UP indicates a vehicle body upward direction, and a sign LH indicates a vehicle body leftward direction.

Figure 1:
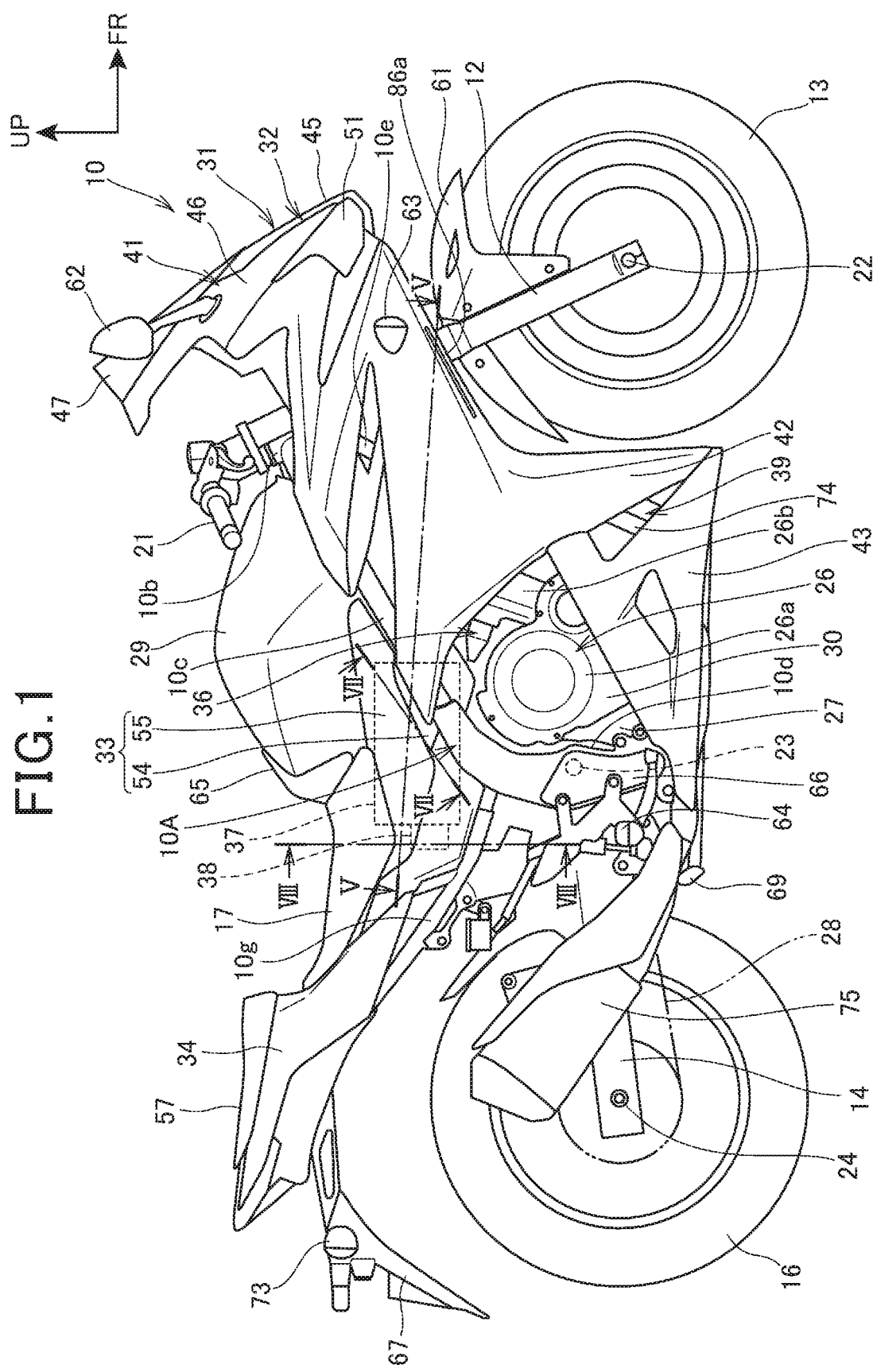
FIG. 1 is a right side view of a motorcycle including a cowl structure according to the present invention.

FIG. 1 is a right side view of a motorcycle 10 including a cowl structure according to the present invention.

The motorcycle 10 is a saddled vehicle in which a front wheel 13 is supported at the front end portion of a vehicle body frame 10A via a front fork 12, a rear wheel 16 is supported in a lower part of the vehicle body frame 10A via a swing arm 14, and a main seat 17 for a driver is supported in an upper part of the vehicle body frame 10A.

The vehicle body frame 10A includes a head pipe 10b, a pair of left and right main frames 10c, a pair of left and right pivot frames 10d, a down frame 10e, a pair of left and right seat frames 10f (see FIG. 5), and a pair of left and right sub-frames 10g.

The head pipe 10b steerably supports the front fork 12. The main frames 10c extend rear obliquely downward on the left and right from the head pipe 10b. The pivot frames 10d extend substantially downward from the rear ends of the main frames 10c. The down frame 10e extends substantially downward from the head pipe 10b. The seat frames 10f extend rear obliquely upward from the main frames 10c and support the main seat 17. The sub-frames 10g extend rear obliquely upward in upper parts of the pivot frames 10d and below the seat frames 10f and are connected to rear parts of the seat frames 10f.

A bar handle 21 is attached to an upper part of the front fork 12. The front wheel 13 is supported in a lower part of the front fork 12 via an axle 22. The front end portion of the swing arm 14 is swingably supported by a pivot shaft 23 provided in the left and right pivot frames 10d. The rear wheel 16 is supported at the rear end portion of the swing arm 14 via an axle 24.

An engine 26 is supported in the center of the vehicle body frame 10A. Power is transmitted from a transmission 27 integrally provided in the engine 26 to the rear wheel 16 via a chain 28.

The engine 26 and the transmission 27 configure a power unit 30.

A fuel tank 29 is supported by the left and right main frames 10c above the engine 26. A tank pad 65 is provided in a rear part of the fuel tank 29. The pivot frames 10d and the down frame 10e support the engine 26.

The engine 26 includes a crank case 26a in which a crank shaft is rotatably housed and a cylinder section 26b erected upper obliquely forward from a front upper part of the crank case 26a. An air intake device 36 is connected to a rear part of the cylinder section 26b. The air intake device 36 includes an air cleaner box 37 and an air intake duct 38 connected to a rear part of the air cleaner box 37. An exhaust device 39 is connected to a front part of the cylinder section 26b.

The motorcycle 10 is covered by a vehicle body cover 31. The vehicle body cover 31 includes a front cowl 32, a pair of left and right side cowls 33, and a pair of left and right rear side body covers 34.

The front cowl 32 includes an upper cowl 41, a pair of left and right middle cowls 42, and a pair of left and right lower cowls 43.

The upper cowl 41 forms the front surface of the front cowl 32 and includes a center upper cowl 45 located in a vehicle width direction center and lower part and a pair of left and right side upper cowls 46 located on a vehicle width direction outer side. A windscreen 47 is attached to the left and right side upper cowls 46. A headlight 51 is disposed below the side upper cowls 46.

The middle cowls 42 are portions that form left and right side surfaces of the front cowl 32 and cover, from vehicle body sides, a vehicle body front part up to a position lower than the axle 22 of the front wheel 13. The lower cowls 43 extend from front end portions connected to the lower end portions of the middle cowls 42 to sides of a lower part of the engine 26.

The side cowls 33 are configured from substantially V-shape inner side cowls 54 and inverted triangular outer side cowls 55 that cover outer sides of upper parts of the inner side cowls 54. The side cowls 33 cover lower parts of the main seat 17 and the fuel tank 29 from sides.

The rear side body covers 34 cover, from sides, lower parts of respective side edge portions of a rear part of the main seat 17 for the driver and a rear seat 57 for a fellow passenger disposed behind the main seat 17.

The air cleaner box 37 and the air intake duct 38 are disposed on a vehicle width direction inner side of the side cowls 33. In particular, the air intake duct 38 is disposed on a vehicle width direction inner side of rear parts of the inner side cowls 54.

In the figure, reference numeral 61 denotes a front fender that covers the front wheel 13 from above, 62 denotes a pair of left and right rearview mirrors attached to the side upper cowls 46, 63 denotes a pair of left and right front blinkers attached to front upper parts of the middle cowls 42, and 64 denotes a pair of left and right driver steps. Reference numeral 66 denotes a pair of left and right plate members attached to lower side surfaces of the pivot frames 10d, 67 denotes a rear fender that covers the rear wheel 16 from above, 69 denotes a side stand attached to the lower end portion of the pivot frame 10d on the left side, 73 denotes a pair of left and right rear blinkers attached to the rear fender 67, and 74 and 75 denote an exhaust pipe and a muffler configuring the exhaust device 39.

Figure 2:
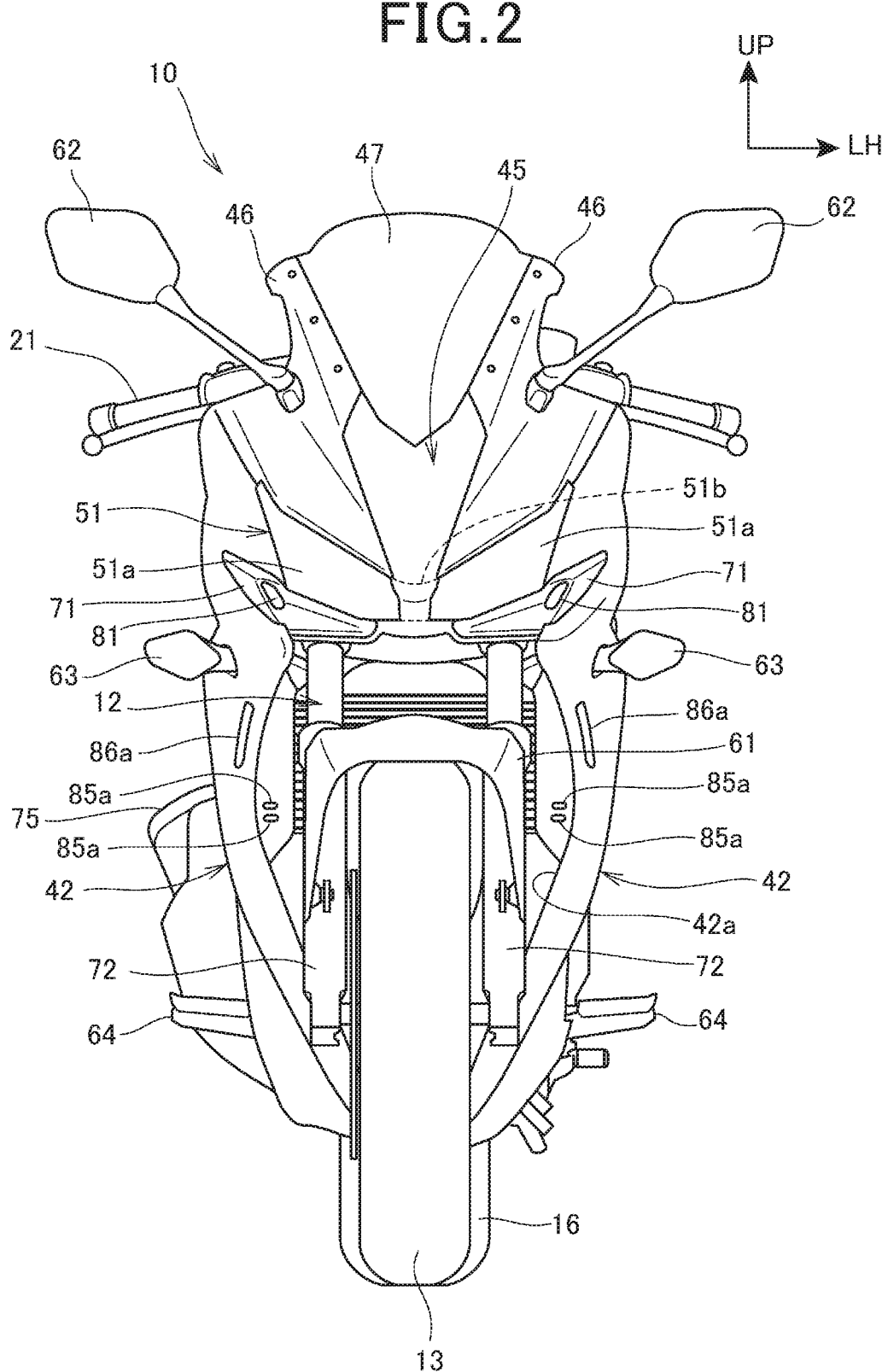
FIG. 2 is a front view showing the motorcycle.

FIG. 2 is a front view showing the motorcycle 10.

The headlight 51 includes a pair of left and right exposed sections 51a, 51a that is exposed to the outside and emits light and a connecting section 51b that integrally connects the left and right exposed sections 51a, 51a. The headlight 51 has an exterior like a two-lamp type with the connecting section 51b covered from the front by the center upper cowl 45.

The center upper cowl 45 extends in the up-down direction across the headlight 51. A lower part of the center upper cowl 45 extends in a substantially horizontal direction.

A pair of left and right headlight lower covers 71, 71 is disposed below the headlight 51 and in front of the center upper cowl 45. Ducts 81 for taking traveling wind into the vehicle body cover 31 are provided in the headlight lower covers 71.

The lower part of the center upper cowl 45, the left and right headlight lower covers 71, 71, and the left and right middle cowls 42, 42 form an opening 42a opened forward. The front fork 12 projects front obliquely downward from the opening 42a.

The front fork 12 includes a pair of left and right fork tubes 72. The fork tubes 72 have a telescopic structure and are configured from springs that support the weight of the motorcycle 10 and dampers that attenuate vibration.

At the front end portions of the middle cowls 42, a pair of left and right front end portion upper openings 86a, 86a and front end portion lower openings 85a respectively provided in pairs on the left and the right are formed.

The frontend portion upper openings 86a are set as substantially the same height as the upper end of a front fender 61 and formed along the edge of the opening 42a. The front end portion lower openings 85a are laterally long openings. The pair of front end portion lower openings 85a is vertically disposed side by side.

Figure 3:
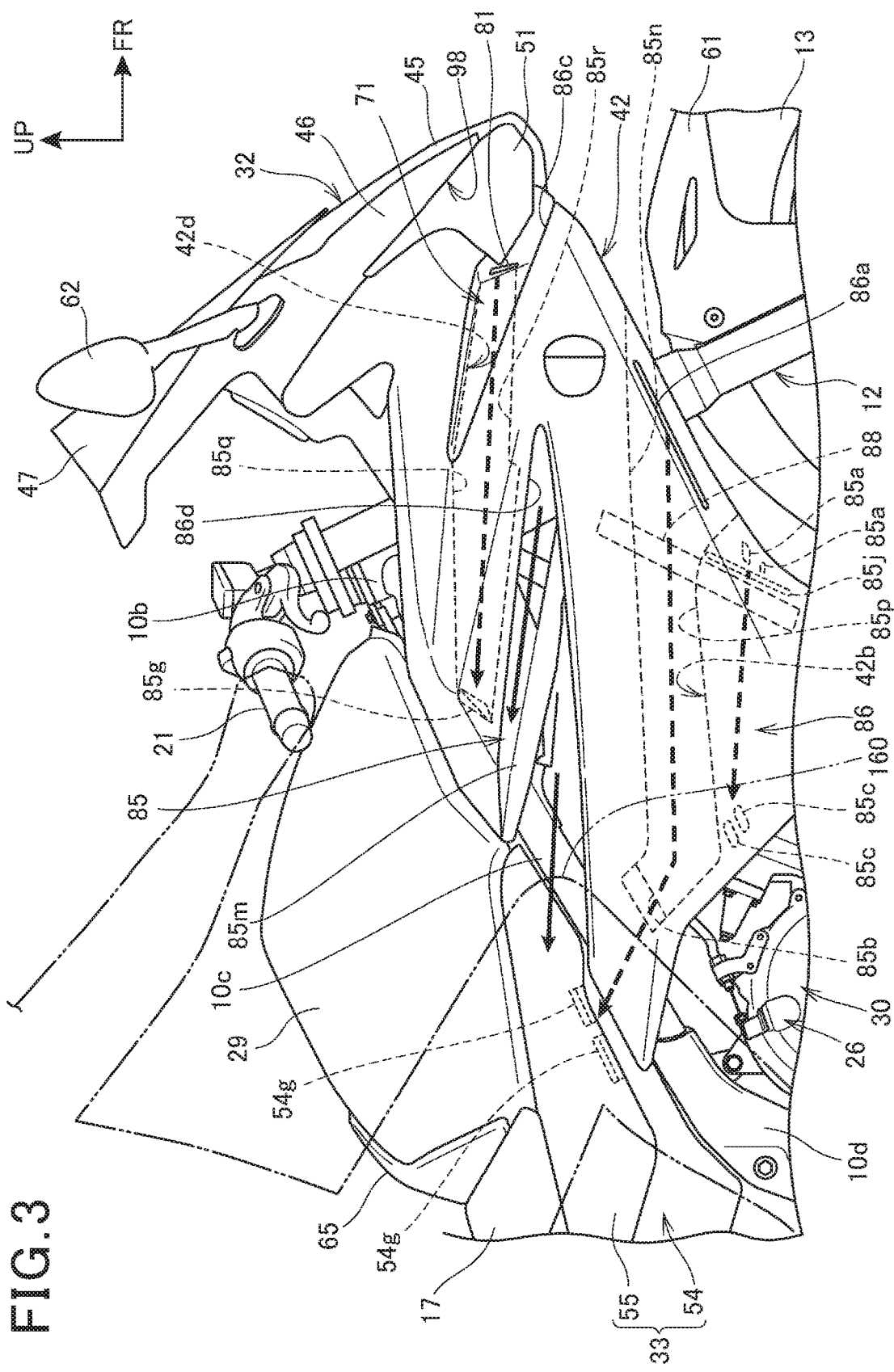
FIG. 3 is a right side view showing a front upper part of the motorcycle.

FIG. 3 is a right side view showing a front upper part of the motorcycle 10. Note that flows of the air indicated by arrows in the figure are explained with reference to FIG. 12.

A gap 98 is provided between the lower edge portion of the side upper cowl 46 and the upper edge portion of the headlight 51. The gap 98 is formed to guide the traveling wind to the rear of the side upper cowl 46 and the windscreen 47 via the gap 98 and suppress generation of a negative pressure behind the front cowl 32 during vehicle traveling. Consequently, engulfing of the traveling wind to the rear of the front cowl 32 is reduced.

The middle cowl 42 is configured from an inner middle cowl 85 and an outer middle cowl 86 disposed in the outer side of the inner middle cowl 85. In the outer middle cowl 86, a front side cutout 86c opened to the front side and a rear side cutout 86d opened to the rear side are formed. The headlight lower cover 71 is disposed in the front side cutout 86c. A part of the inner middle cowl 85 is exposed to the outer side from the rear side cutout 86d.

An air intake passage 42b extending substantially in the front-rear direction between the inner middle cowl 85 and the outer middle cowl 86 is formed below the rear side cutout 86d of the middle cowl 42.

The distal end portion of the air intake passage 42b communicates with a front end portion upper opening 86a. The rear end portion of the air intake passage 42b communicates with a rear end portion opening 85b formed at the rear end portion of the inner middle cowl 85. The traveling wind flows into the air intake passage 42b from the front end portion upper opening 86a, which is an inlet, and flows out into the middle cowl 42 from the rear end portion opening 85b, which is an outlet.

A pair of upper and lower rear end portion lower openings 85c, 85c located below a rear part of the air intake passage 42b is opened near the rear edge of the inner middle cowl 85. Note that reference numeral 88 in the figure denotes a radiator.

An upper air intake passage 42d extending substantially in the front-rear direction between the inner middle cowl 85 and the outer middle cowl 86 is formed above the rear side cutout 86d of the middle cowl 42.

The distal end portion of the upper air intake passage 42d communicates with the duct 81. The rear end portion of the upper air intake passage 42d communicates with an upper discharge port 85g of the inner middle cowl 85 explained in detail below. The traveling wind flows into the upper air intake passage 42d from the duct 81, which is an inlet side, and flows out into the middle cowl 42 from the upper discharge port 85g, which is an outlet.

Figure 4:
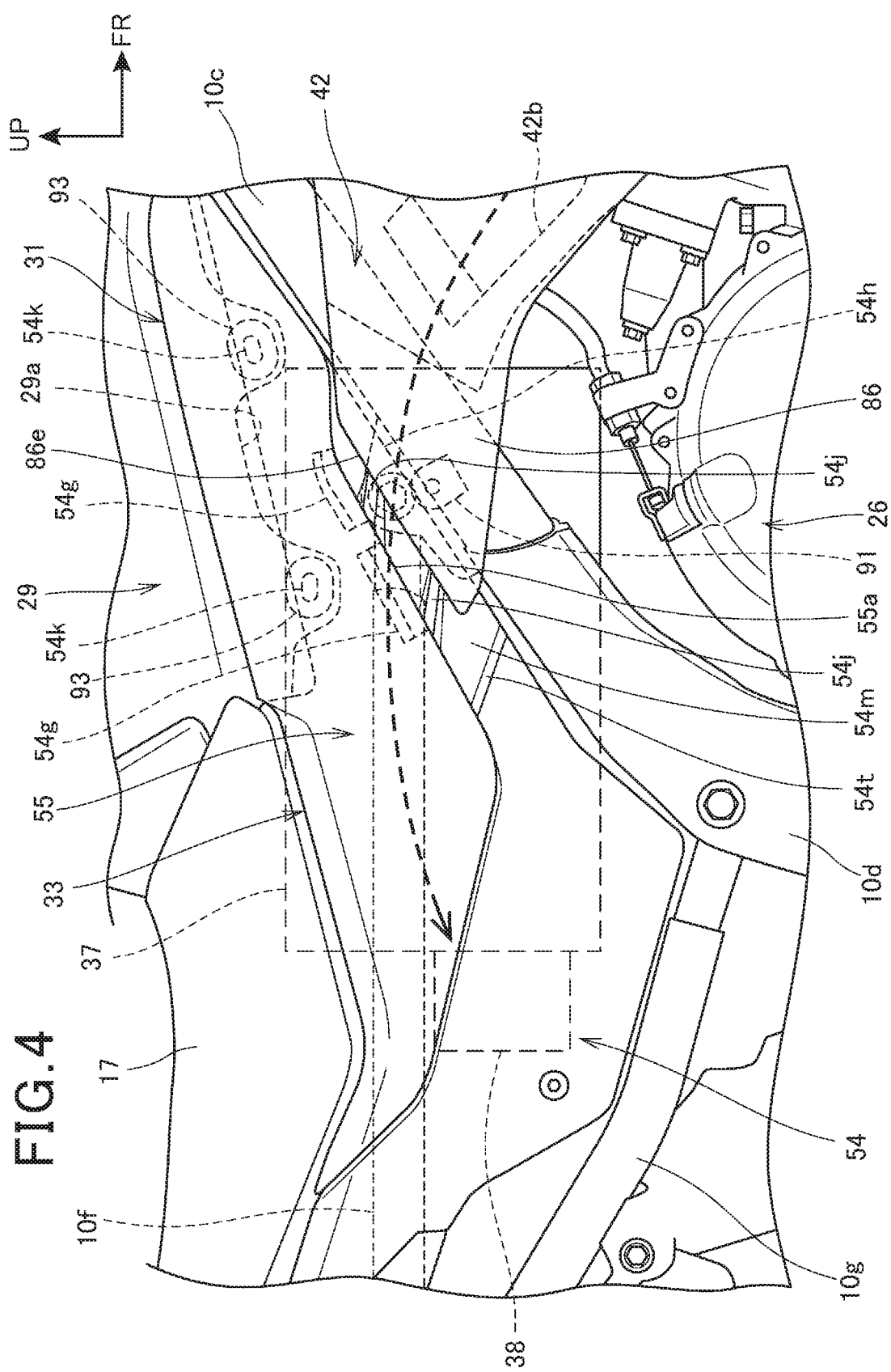
FIG. 4 is a main part enlarged view of FIG. 3.

FIG. 4 is a main part enlarged view of FIG. 3.

Figure 6:
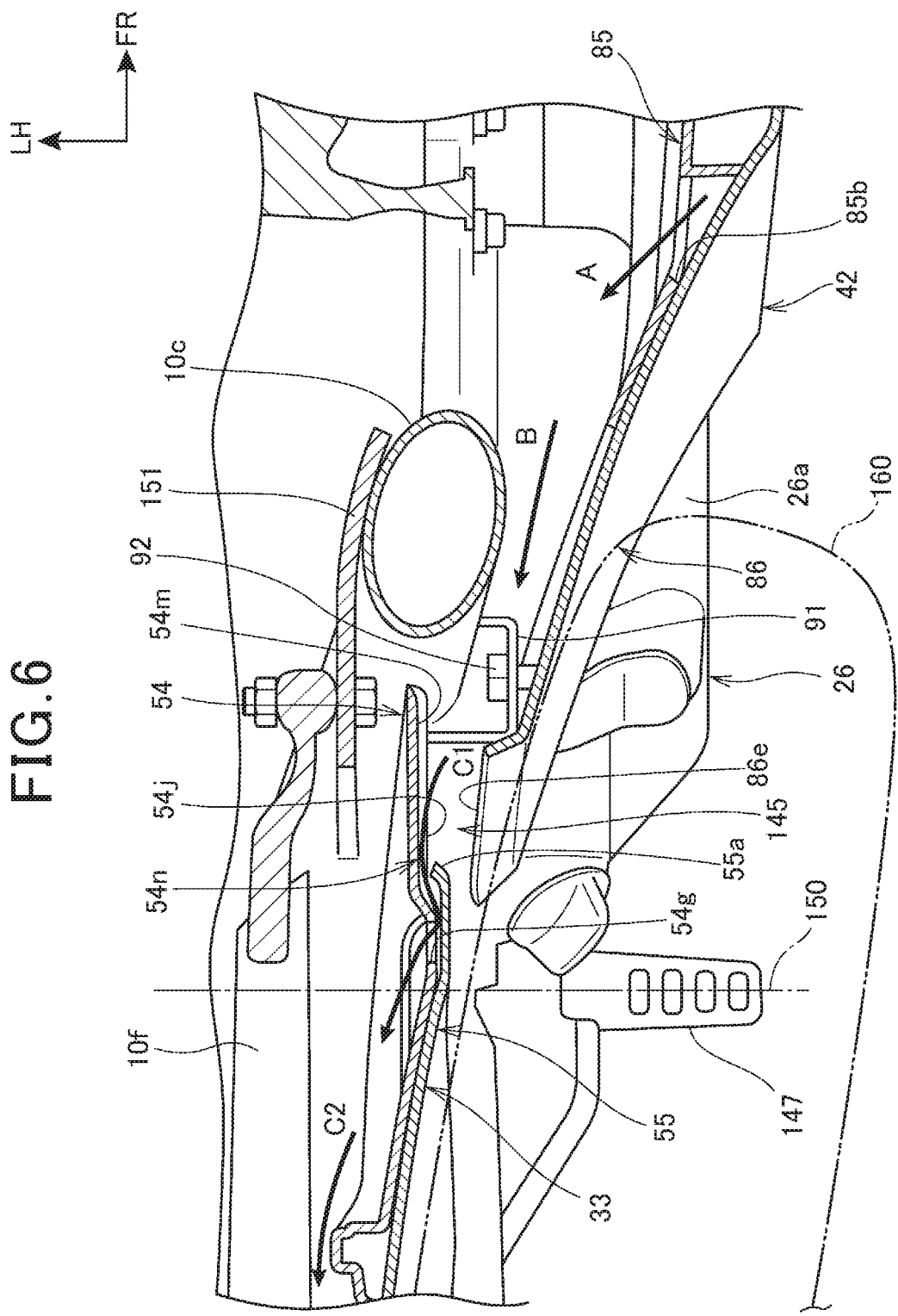
FIG. 6 is a main part enlarged view of FIG. 5.

The rear end portion of the middle cowl 42 (specifically, the outer middle cowl 86) is attached to a stay 91, which extends from the main frame 10c to the vehicle width direction outer side, by a bolt 92 (see FIG. 6).

In the inner side cowl 54 of the side cowl 33, a pair of air intake ports 54g, 54g is formed to extend along a rear edge 86e inclining rearwardly downward of the outer middle cowl 86.

The air intake ports 54g are portions for taking the outside air into the side cowl 33 and facilitating suction from the air intake duct 38. The pair of air intake ports 54g, 54g is covered by a front edge portion 55a of the outer side cowl 55 from the outer side. Therefore, the air intake ports 54g are not exposed to the outside. It is possible to improve appearance.

In the inner side cowl 54, a pair of upper and lower protrusion sections 54j, 54j projecting to the vehicle width direction outer side is formed to extend in the front-rear direction from the vicinity of the air intake port 54g to a front edge 54h. Note that reference sign 54t denotes a step section formed below the protrusion section 54j on the lower side.

The protrusion sections 54j are portions that secure an air passage to the air intake ports 54g. The protrusion sections 54j project to the vehicle width direction outer side from an outer side surface 54m of the front end portion of the inner side cowl 54 and exposed from between the rear edge 86e of the outer middle cowl 86 and the front edge portion 55a of the outer side cowl 55.

A front part of the inner side cowl 54 is attached to a side edge portion 29a that extends downward from a side of the fuel tank 29. Specifically, a pair of inner protrusions 54k, 54k projecting to the vehicle width direction inner side from the inner surface of the inner side cowl 54 is inserted into and fixed in attachment holes (not shown in the figure), which are formed at a side edge portion 29a of the fuel tank 29, via a grommet 93 made of rubber.

A broken line arrow in the figure indicates a flow of the air in the vehicle body cover 31. That is, the air passes through the air intake passage 42b in the middle cowl 42 and the air intake port 54g of the side cowl 33 and reaches the air intake duct 38.

Figure 5:
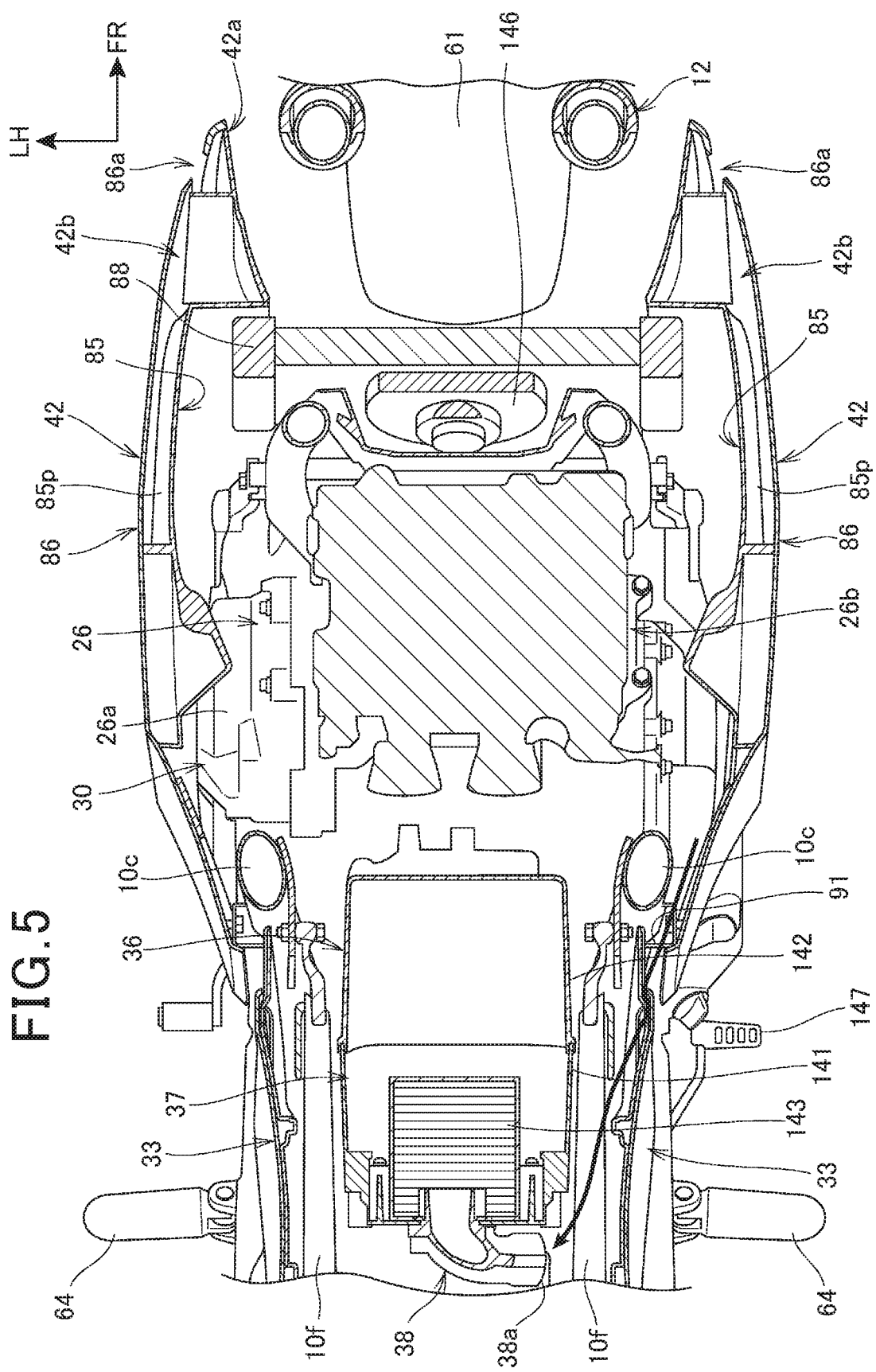
FIG. 5 is a V-V line sectional view of FIG. 1.

FIG. 5 is a V-V line sectional view of FIG. 1.

On the inner side of the openings 42a of the left and right middle cowls 42, 42, the radiator 88, the engine 26, and the air cleaner box 37 and the air intake duct 38 configuring the air intake device 36 are disposed in order from the front side.

The air intake passages 42b are formed between the inner middle cowls 85 and the outer middle cowls 86 of the middle cowls 42.

The radiator 88 and the engine 26 are covered by the middle cowls 42 from both sides. The air cleaner box 37 and the air intake duct 38 are covered by the middle cowls 42 and the side cowls 33 from both sides.

The air cleaner box 37 includes an air cleaner case main body 141, an air cleaner case cover 142 that closes an opening of the air cleaner case main body 141, and an air filter element 143 detachably attached in the air cleaner case main body 141.

The air cleaner case cover 142 is connected to the engine 26 via a connecting tube, a throttle body, and an air intake pipe not shown in the figure.

The air intake duct 38 is connected to a rear part of the air cleaner case main body 141.

An arrow in the figure indicates a flow of the air along the middle cowl 42 and the side cowl 33.

The air sucked from a suction port 38a of the air intake duct 38 flows into a dirty side, which is one chamber in the air cleaner box 37, and passes through the air filter element 143 to be purified. Further, the air enters a clean side, which is the other chamber in the air cleaner box 37, and passes through the components explained above from the clean side to be supplied to the engine 26. Note that reference numeral 146 in the figure denotes a radiator fan that forcibly sucks air into the radiator 88 and 147 denotes a brake pedal for rear wheel braking.

Figure 7:
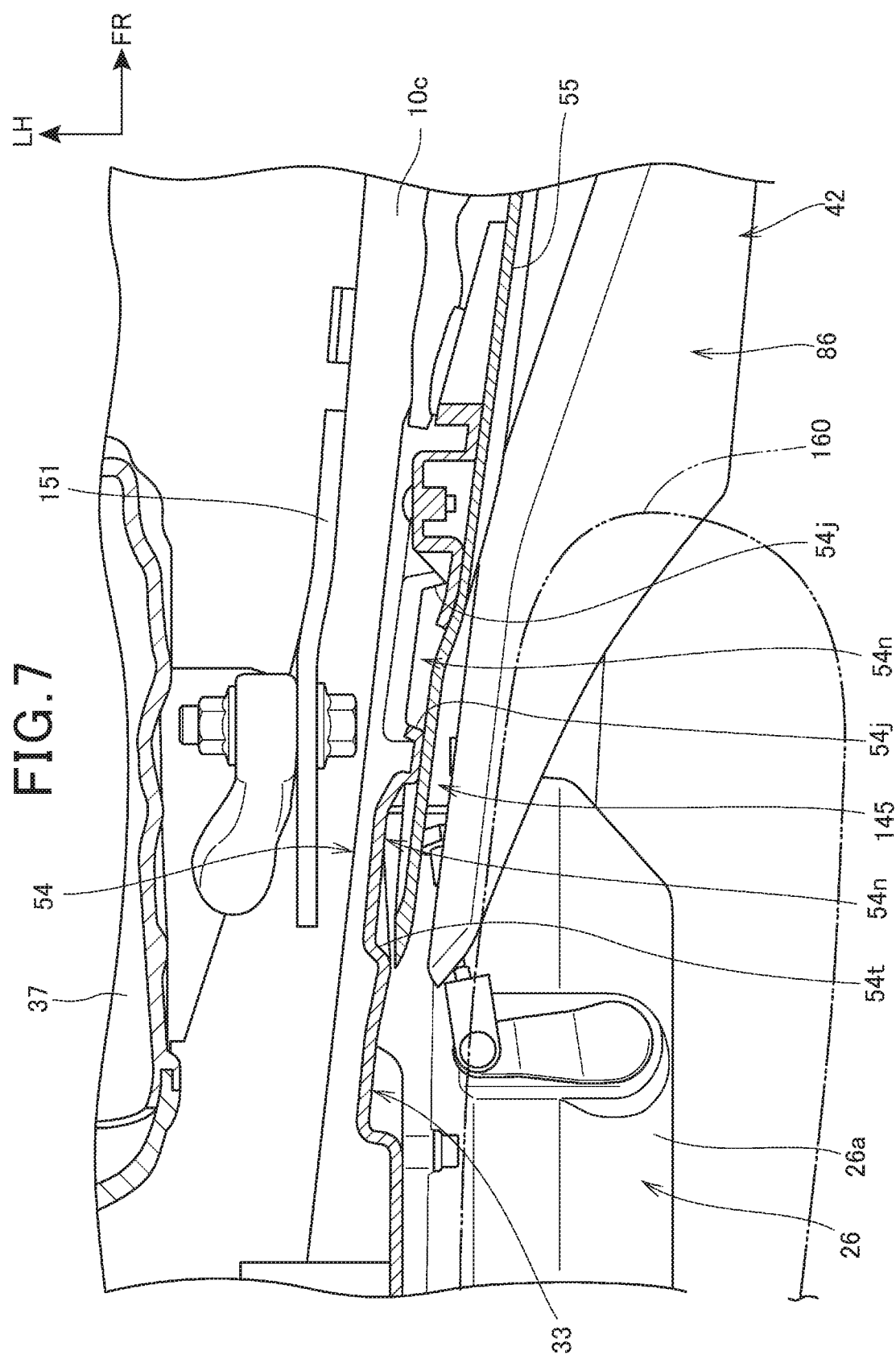
FIG. 7 is a VII-VII line sectional view of FIG. 1.

FIG. 6 is a main part enlarged view of FIG. 5. FIG. 7 is a VII-VII line sectional view of FIG. 1.

As shown in FIG. 6, the inner side cowl 54 of the side cowl 33 includes the protrusion section 54j projecting to the outer side from the outer side surface 54m of the inner side cowl 54 and extending in the front-rear direction and the air intake port 54g formed behind the protrusion section 54j.

The front edge portion 55a of the outer side cowl 55 of the side cowl 33 is bent to the vehicle width direction inner side to be set close to or in contact with the protrusion section 54j.

The inner side cowl 54 is disposed above the main frame 10c. A support bracket 151 is attached to the main frame 10c. The front end portion of the seat frame 10f is fastened to the support bracket 151 by a bolt and a nut.

A gap 145 functioning as an air passage is formed between the side cowl 33 and the rear end portion of the middle cowl 42 (specifically, the outer middle cowl 86).

Reference numeral 150 denotes a straight line passing through the center of the front-rear width in a stepping section of the brake pedal 147 and extending in the vehicle width direction. Since the air intake port 54g is formed further forward than the straight line 150, the air intake port 54g is less easily closed by the leg during knee-grip according to a positional relation between the brake pedal 147 and the leg of the driver.

As shown in FIG. 7, by forming a plurality of protrusion sections 54j in the inner side cowl 54 of the side cowl 33, a plurality of groove-like wind guide passages 54n for guiding the outside air to the intake port 54g (see FIG. 6) are formed among the protrusion sections 54j, 54j.

For example, even when the driver presses a knee 160 against the side cowl 33 and the middle cowl 42 to perform the knee-grip, the wind guide passages 54n are secured.

Further, the rear edge portion of the middle cowl 42 is disposed further on the outer side than the air intake port 54g and the protrusion sections 54j. Therefore, since the leg including the knee 160 of the driver is disposed away from the air intake port 54g and the protrusion sections 54j to the outer side, it is easy to secure an air passage to the air intake port 54g.

In FIG. 6 and FIG. 7, as indicated by an arrow A, the outside air flows out from the air intake passage 42b in the middle cowl 42 into the vehicle body through the rear end portion opening 85b. As indicated by an arrow B, the outside air moves to the vehicle rear along the inner surface of the outer middle cowl 86. Subsequently, as indicated by arrows C1 and C2, the outside air passes through the wind guide passage 54n between the outer side surface 54m of the inner side cowl 54 and the front edge portion 55a of the outer side cowl 55 and reaches the air intake port 54g, passes through the air intake port 54g and flows into the vehicle width direction inner side of the side cowl 33, and flows to the air intake duct 38.

As explained above, since the air intake passage 42b is provided in the middle cowl 42, it is possible to form a cowl structure in which the traveling wind is effectively utilized. Therefore, it is possible to effectively supply the outside air to the power unit 30.

Figure 8:
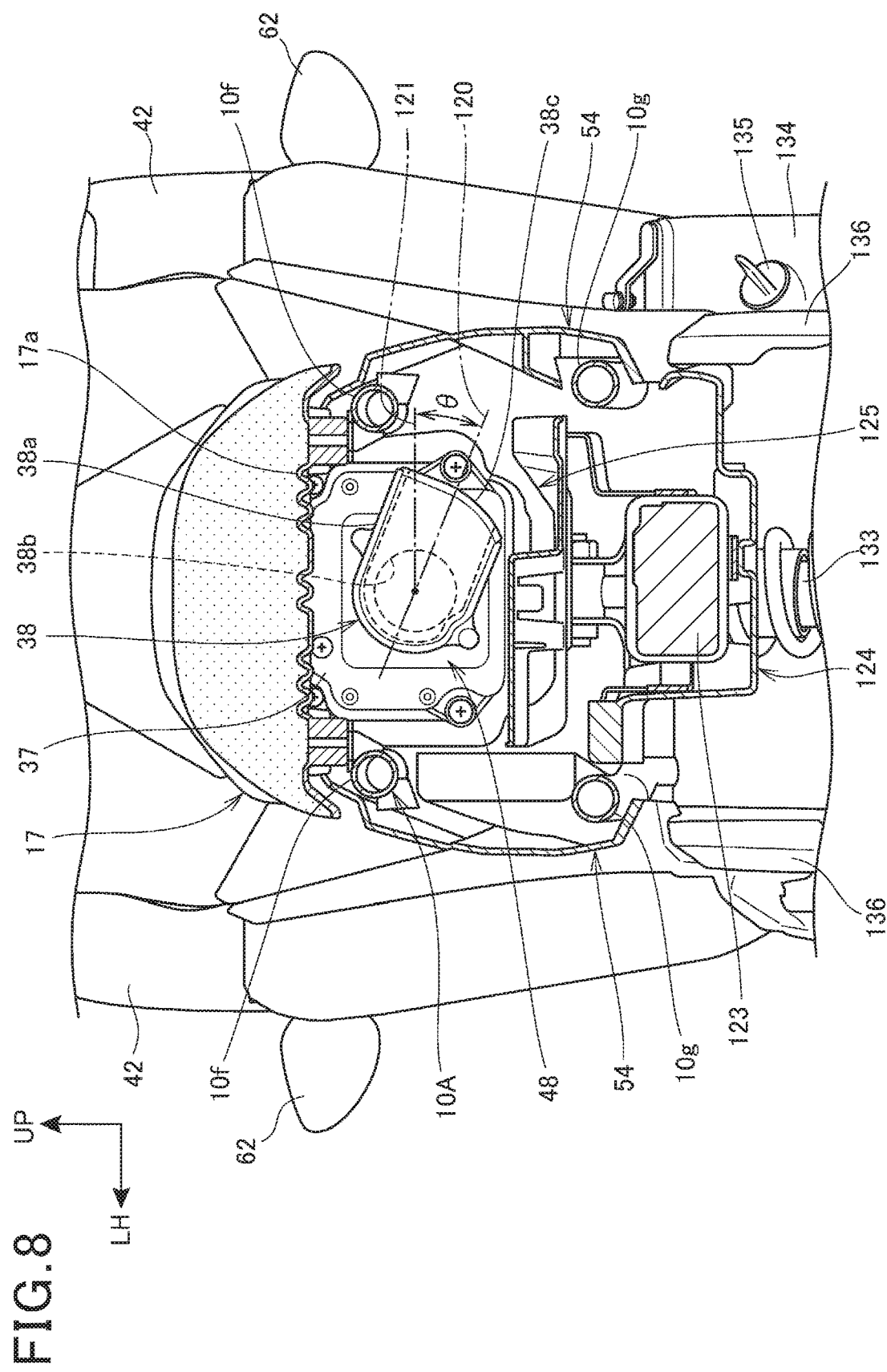
FIG. 8 is a VIII-VIII line sectional view of FIG. 1.

FIG. 8 is a VIII-VIII line sectional view of FIG. 1.

The air intake duct 38 having a tubular shape is connected to a rear part of the air cleaner box 37.

The air intake duct 38 includes the suction port 38a for sucking the air and an intake port 38b opened on the air cleaner box 37 side in the suction port 38a in order to take the air into the air cleaner box 37 from the suction port 38a. Note that reference sign 38c denotes an opening of the suction port 38a.

A suction port center line 120 extending in the longitudinal direction of the suction port 38a and passing the center of the width of the suction port 38a extends to tilt vehicle body right obliquely downward from the intake port 38b side to the opening 38c side.

The suction port center line 120 tilts by an angle θ with respect to a horizontal line 121. The suction port 38a tilts in this way in order to tilt the suction port center line 120 vehicle body right obliquely downward even if the vehicle body tilts to the left side and prevent rain water from intruding into the suction port 38a from the opening 83c when the vehicle is stopped or parked using the side stand 69 (see FIG. 1) provided at the lower end portion of the pivot frame 10d (see FIG. 1) on the left side configuring the vehicle body frame 10A.

A bottom plate 17a configuring the lower surface of the main seat 17 is disposed above the air cleaner box 37 and the air intake duct 38 (the air cleaner box 37 and the air intake duct 38 are hereinafter referred to as "air intake component 48"). An ABS module 123 and an ABS module cover 124 that covers a lower part and the left and right sides of the ABS module 123 are disposed below the air intake component 48. The ABS module 123 is configured from an electric motor, a pump driven by the electric motor, a plurality of liquid pressure pipes connected to the pump, a solenoid valve provided halfway in the liquid pressure pipes, and the like. When a brake lever or a brake pedal is operated to perform quick braking of the front wheel 13 (see FIG. 1) and the rear wheel 16 (see FIG. 1) by a front wheel brake and a rear wheel brake, actuation of the electric motor, opening and closing of the solenoid valve, and the like are controlled by a control device separate from the ABS module 123 and lock of the front wheel 13 and the rear wheel 16 is prevented.

Since the left and right sides of the air intake component 48 are covered by the inner side cowl 54, the air intake component 48 is disposed in a space 125 surrounded by the bottom plate 17a of the main seat 17, the ABS module cover 124, and the left and right inner side cowls 54, 54. By forming the space 125 surrounded by the cover and the like in this way, it is possible to make it easy to suck the air in the space 125 from the air intake duct 38.

The pair of left and right seat frames 10f, 10f and the pair of left and right sub-frames 10g, 10g passes through the space 125.

Reference numeral 133 denotes a rear cushion unit laid between the vehicle body frame and the swing arm (see FIG. 1), 134 denotes a crank case cover included in the crank case 26a (see FIG. 1) of the engine 26 (see FIG. 1), 135 denotes an oil injection port cap provided in the crank case cover 134, and 136 denotes a pair of left and right lower frame covers that covers a lower part of the vehicle body frame 10A from the outer side.

Figure 9:
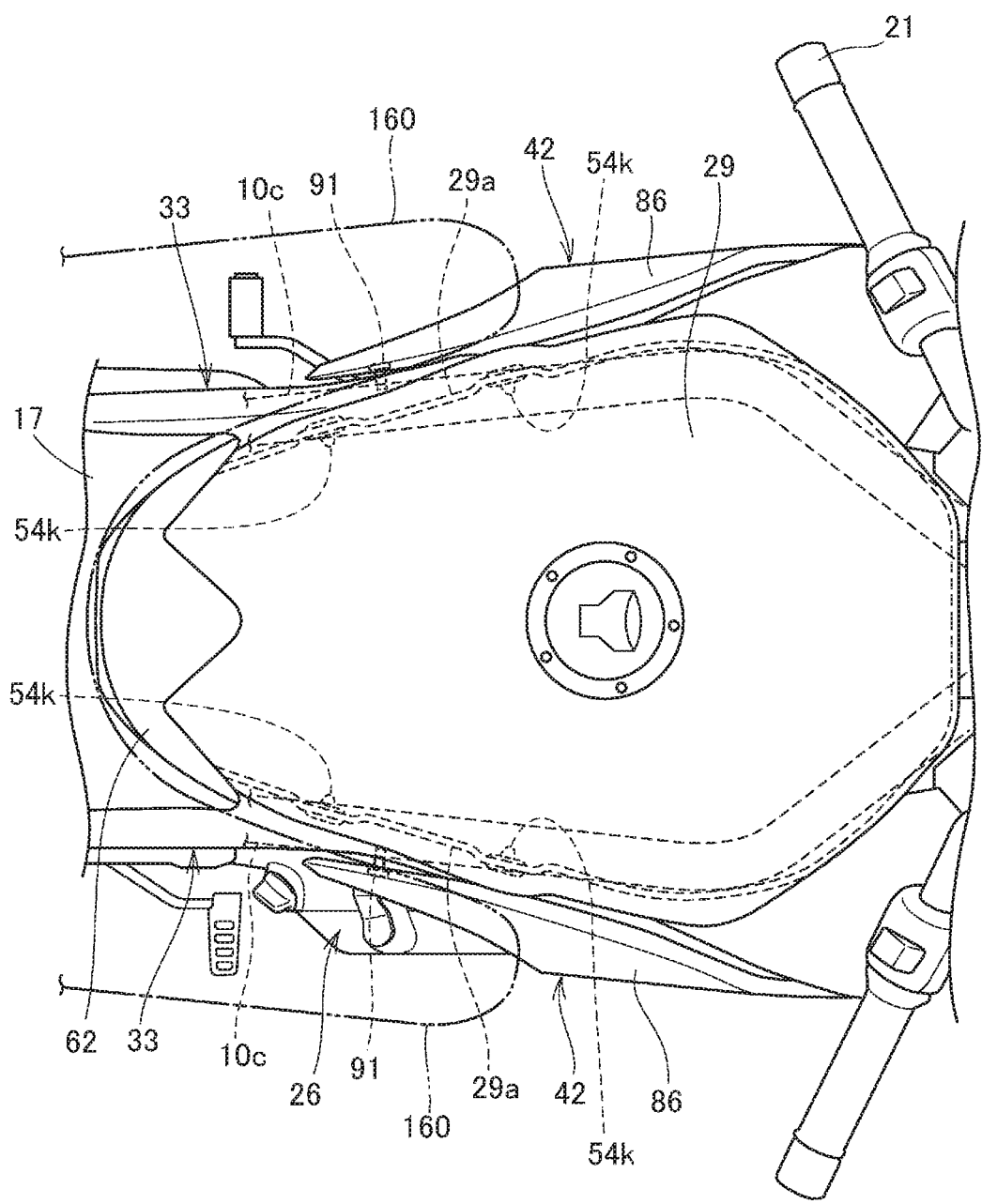
FIG. 9 is a plan view showing left and right side cowls, middle cowls, and a periphery of the left and right side cowls and the middle cowls.

FIG. 9 is a plan view showing the left and right side cowls 33, the middle cowls 42, and the periphery of the left and right side cowls 33 and the middle cowls 42.

The stays 91 respectively extending to the vehicle width direction outer sides are attached to rear parts of the pair of left and right main frames 10c, 10c. The left and right middle cowls 42, specifically, the rear end portions of the outer middle cowls 86 are supported by the stays 91.

Front parts of the inner side cowls 54 (see FIG. 6) of the side cowls 33 are supported by the left and right side edge portions 29a, 29a provided in a side lower part of the fuel tank 29.

The rear end portions of the outer middle cowls 86 and the front parts of the inner side cowls 54, as explained above, are portions that are pressed against the vehicle width direction inner side by the legs together with the side surface of the fuel tank 29 when the driver performs the knee-grip. A pressing force of the portions is supported by the supporting structure explained above.

FIGS. 10A and 10B are explanatory diagrams showing the inner side cowl 54. FIG. 10A is a side view of the inner side cowl 54. FIG. 10B is a front view of the inner side cowl 54.

As shown in FIG. 10A, the inner side cowl 54 includes, on the front side, a wind guide section 54p in which a plurality of wind guide passages 54n are formed and an inclined section 54q formed to gradually extend to the vehicle width direction outer side from the respective rear ends of the protrusion sections 54j of the wind guide section 54p and the outer side surface 54m.

In the inclined section 54q, the air intake ports 54g located behind the wind guide passage 54n are opened.

By forming the air intake ports 54g in the inclined section 54q in this way, for example, compared with when air intake ports are provided on a surface extending in the front-rear direction, it is possible to allow the traveling wind from the vehicle front to easily flow into the air intake ports 54g.

As shown in FIG. 10B, a plurality of inner protrusions 54k projecting to the vehicle width direction inner side are integrally formed on a rear surface 54r of the inner side cowl 54. The inner protrusions 54k in an upper part are fit in the fuel tank 29 (see FIG. 3). Note that reference sign 54s denotes a vehicle body side attaching section integrally molded at the rear end portion in the inner side cowl 54. The vehicle body side attaching section 54s is attached to the seat frame 10f (see FIG. 5).

Figure 11A:
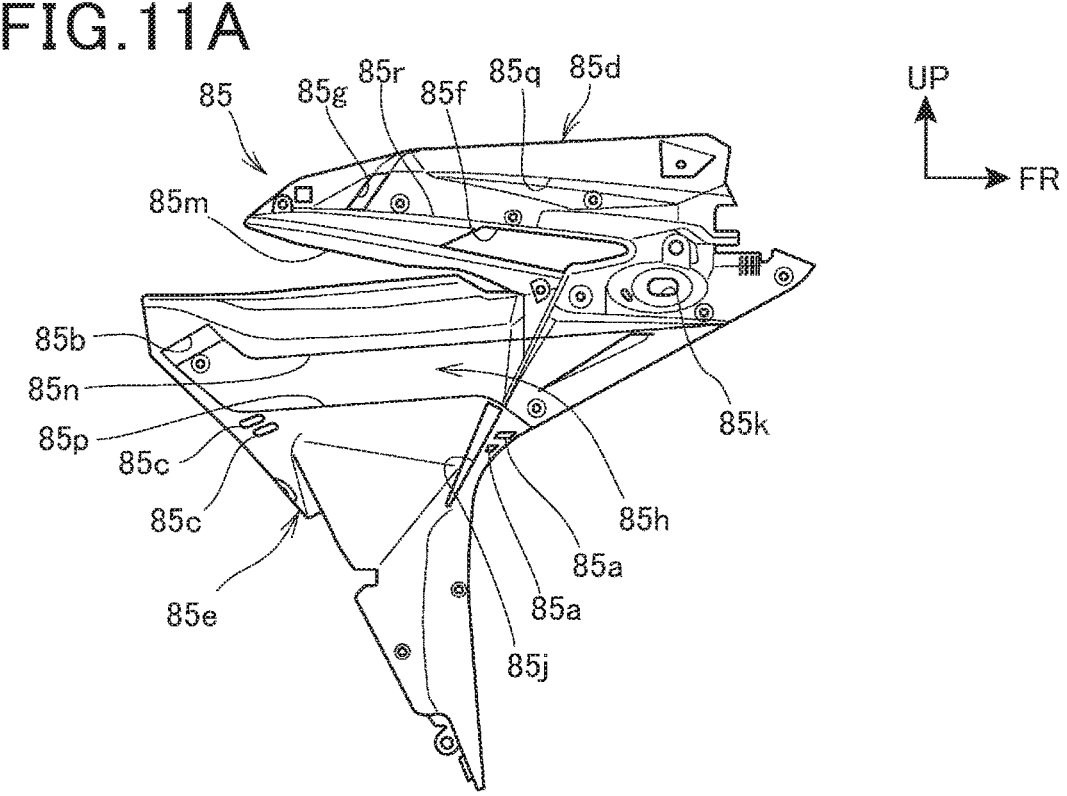
Figure 11B:
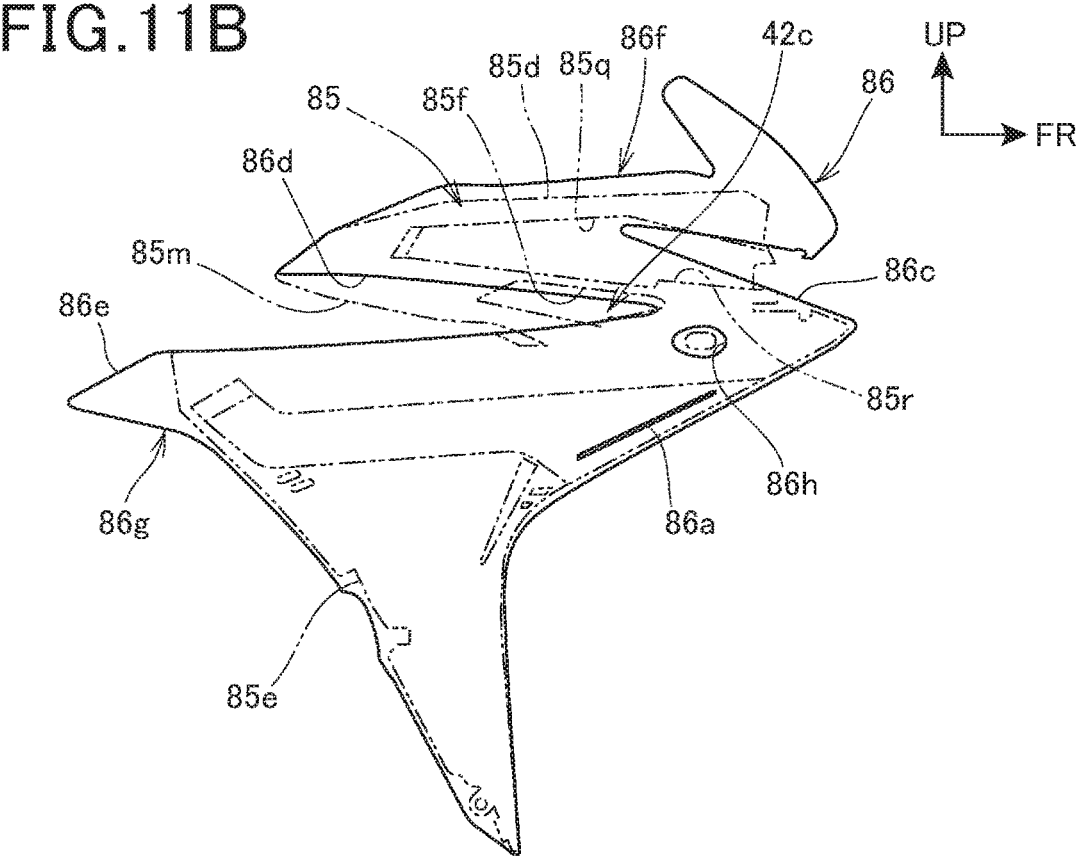

FIGS. 11A and 11B are explanatory diagrams showing the inner middle cowl 85 and the outer middle cowl 86 of the middle cowl 42. FIG. 11A is a side view showing the inner middle cowl 85. FIG. 11B is a side view showing the outer middle cowl 86.

As shown in FIG. 11A, the inner middle cowl 85 is configured from a substantially triangular inner upper middle cowl 85d and an inner lower middle cowl 85e integrally connected to the front lower end portion of the inner upper middle cowl 85d.

In the inner upper middle cowl 85d, a duct opening 85f, through which the duct 81 (see FIG. 2) of the headlight lower cover 71 (see FIG. 2) is inserted, and an upper discharge port 85g provided rear obliquely above the duct opening 85f in order to discharge the air in the middle cowl 42 (see FIG. 3) to the vehicle body inner side are formed.

The inner upper middle cowl 85d includes a pair of upper ribs 85q and 85r provided vertically apart from each other to extend in the front-rear direction in order to form the upper air intake passage 42d (see FIG. 3). The upper ribs 85q and 85r are formed to project to the vehicle width direction outer side.

The inner lower middle cowl 85e includes an air intake passage groove 85h provided to extend in the front-rear direction in order to form the air intake passage 42b (see FIG. 3), the rear end portion opening 85b provided at the rear end of the air intake passage groove 85h, front end portion lower openings 85a, 85a, and a vertically long front end portion vertical opening 85j provided near the rear of the front end portion lower opening 85a in order to take the air into the middle cowl 42.

The air intake passage groove 85h is formed by a pair of ribs 85n and 85p, side walls on both sides of which project to the vehicle width direction outer side and extend in the front-rear direction. Note that reference sign 85k denotes a blinker attachment hole to which the front blinker 63 (see FIG. 1) is attached.

As shown in FIG. 11B, the outer middle cowl 86 is integrally formed from an outer upper middle cowl 86f and an outer lower middle cowl 86g formed to respectively overlap, in the vehicle width direction, the inner upper middle cowl 85d and the inner lower middle cowl 85e of the inner middle cowl 85 indicated by an imaginary line.

A lower edge portion 85m of the inner upper middle cowl 85d is exposed to a side from the rear side cutout 86d of the outer middle cowl 86 with respect to the outer upper middle cowl 86f. Since the rear side cutout 86d and the duct opening 85f of the inner middle cowl 85 overlap in the vehicle width direction, the traveling wind can be introduced into the vehicle body inside through a middle cowl opening 42c formed from the rear side cutout 86d and the duct opening 85f or the traveling wind and radiator exhaust wind in the vehicle body inside of the middle cowl 42 can be discharged to the outside.

In the outer lower middle cowl 86g, a blinker attachment hole 86h, to which the front blinker 63 (see FIG. 1) is attached, is opened in the upper front part.

Action of the wind guide structure of the vehicle body cover 31 explained above is explained.

Figure 12:
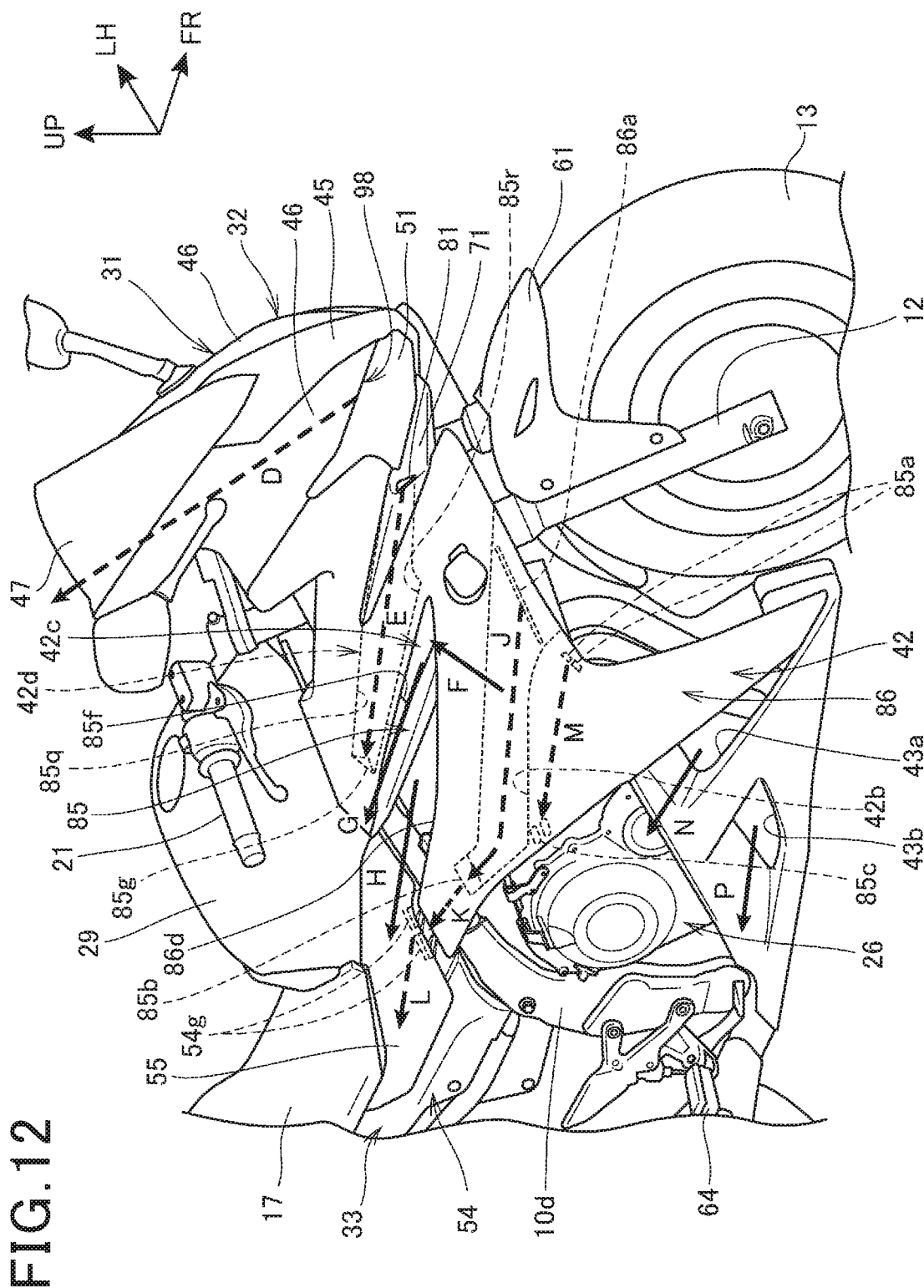
FIG. 12 is an action diagram showing a wind guide structure of a vehicle body cover.

FIG. 12 is an action diagram showing the wind guide structure of the vehicle body cover 31.

As indicated by an arrow D, the traveling wind flows into the rear of the side upper cowl 46 and the windscreen 47 from a gap 98 between the lower edge portion of the side upper cowl 46 and the upper edge portion of the headlight 51. Consequently, a negative pressure generated behind the front cowl 32 during vehicle traveling is suppressed. Engulfing of the traveling wind to the rear of the front cowl 32 is suppressed.

As indicated by an arrow E, the traveling wind is taken into the upper air intake passage 42d in the middle cowl 42 from the duct 81 provided in the headlight lower cover 71. The traveling wind taken into the upper air intake passage 42d flows into the vehicle body inside from the upper discharge port 85g.

As indicated by an arrow F, the traveling wind hitting the middle cowl 42 from a side when the vehicle turns is taken into the vehicle body inside or discharged from the vehicle body inside by the middle cowl opening 42c of the middle cowl 42, whereby it is possible to reduce air resistance when the vehicle is tilted to the left and the right. As a result, since it is easy to switch a tilting direction in which the vehicle is tilted to the left and the right, it is possible to improve turnability of the vehicle. As indicated by an arrow G and an arrow H, it is possible to make it easy to discharge exhaust wind of the radiator 88 (see FIG. 3).

As indicated by an arrow J, the traveling wind is taken into the air intake passage 42b in the middle cowl 42 from the front end portion upper opening 86a of the middle cowl 42 and discharged from the rear end portion opening 85b. As indicated by an arrow K and an arrow L, the traveling wind is taken into the vehicle inside of the side cowl 33 from the air intake port 54g of the side cowl 33 and supplied to the engine 26 from the air intake duct 38 (see FIG. 5) of the air intake device 36 (see FIG. 5) via the air cleaner box 37 (see FIG. 5) and the like.

As indicated by an arrow M, the traveling wind is taken into the middle cowl 42 from the front end portion lower opening 85a provided at the front end of the middle cowl 42 and discharged from the rear end portion lower opening 85c to reduce air resistance of the middle cowl 42.

As indicated by an arrow N and an arrow P, the traveling wind is discharged from a front opening 43a and a rear opening 43b of the lower cowl 43 to remove hot air around the feet of the driver near the engine 26.

A reduction of air resistance, improvement of steering stability, and the like are achieved by the flows of the air indicated by the arrows E, J, M, and the like as explained above.

As shown in FIG. 1, FIG. 4, and FIG. 6, in the cowl structure of the motorcycle 10 functioning as the saddled vehicle including the bar handle 21 steerably supported by the head pipe 10b, the main seat 17 on which the occupant is seated, the side cowl 33 that covers the side lower part of the main seat 17, the air cleaner box 37 provided below the main seat 17 and connected to the power unit 30, and the air intake duct 38 that supplies the outside air to the air cleaner box 37, the side cowl 33 includes the inner side cowl 54 and the outer side cowl 55 disposed on the vehicle width direction outer side of the inner side cowl 54, the air intake port 54g for supplying the traveling wind to the air intake duct 38 is provided near the front end portion of the inner side cowl 54, and the air intake port 54g is covered from the outer side by the outer side cowl 55.

With this configuration, it is possible to prevent the air intake port 54g from being closed by the leg when the occupant performs the knee-grip. Therefore, it is possible to effectively supply the outside air to the power unit 30.

As shown in FIG. 4, FIG. 6, and FIG. 7, the inner side cowl 54 includes the protrusion sections 54j projecting to the outer side. The protrusion sections 54j are provided in the front of the air intake port 54g from the portion on the vehicle width direction inner side of the front end portion of the outer side cowl 55 to the portion where the inner side cowl 54 is exposed to the outside. Therefore, unevenness is formed on the outer side surface of the inner side cowl 54. When the occupant performs the knee-grip, it is possible to prevent the air intake port 54g from being completely closed. Therefore, it is possible to effectively supply the outside air to the power unit 30.

As shown in FIG. 3, FIG. 4, and FIG. 6, the side of the head pipe 10b is covered by the middle cowl 42. The air intake passage 42b is formed on the inside of the middle cowl 42. The rear edge of the middle cowl 42 is disposed on the front side of the air intake port 54g and further on the outer side than the air intake port 54g. The traveling wind passed through the air intake passage 42b is supplied to the air intake duct 38 via the air intake port 54g. Therefore, by disposing the rear edge of the middle cowl 42 on the front side and the outer side of the air intake port 54g, when the occupant places the leg on the middle cowl 42 in order to perform the knee-grip, it is possible to secure a space in the front of the side cowl 33. Consequently, it is possible to effectively supply the outside air to the power unit 30.

As shown in FIG. 3, FIG. 4, and FIG. 5, the main frame 10c extends rearwardly downward from the head pipe 10b. The fuel tank 29 for supplying the fuel to the power unit 30 is provided between the head pipe 10b and the main seat 17. The inner side cowl 54 is disposed above the main frame 10c and supported by the fuel tank 29. The middle cowl 42 is supported by the stay 91 extending sideward from the main frame 10c. Therefore, since the inner side cowl 54 and the middle cowl 42 are supported in a state in which the inner side cowl 54 and the middle cowl 42 are offset in the vehicle width direction, it is possible to form a structure in which the air intake port 54g is much less easily closed by the knee-grip of the occupant. Therefore, the occupant can perform the knee-grip in a state in which a space in the front of the side cowl 33 is secured. It is possible to effectively supply the outside air to the power unit 30. The inner side cowl 54 is supported by the fuel tank 29. The middle cowl 42 (specifically, the outer middle cowl 86) is supported by the main frame 10c via the stay 91. Therefore, it is possible to firmly support the inner side cowl 54 and the middle cowl 42.

The embodiment explained above only indicates an aspect of the present invention. Modifications and applications are optionally possible in a range not departing from the spirit of the present invention.

For example, in the embodiment, as shown in FIG. 1 and FIGS. 11A and 11B, each of the side cowl 33 and the middle cowl 42 is configured by an inner member and an outer member. However, each of the side cowl 33 and the middle cowl 42 may be configured by one member.

As shown in FIG. 4, the inner side cowl 54 is supported by the fuel tank 29 and the inner side cowl 54 and the outer side cowl 55 are fastened. However, not only this, but the outer side cowl 55 may be fastened to the fuel tank 29.

As shown in FIG. 8, the air intake duct 38 is faced right downward. However, not only this, but the air intake duct 38 may be faced left downward.

REFERENCE SIGNS LIST 10 motorcycle (saddled vehicle)
10b head pipe
10c main frame
17 main seat (seat)
21 bar handle (handle)
29 fuel tank
30 power unit
33 side cowl
37 air cleaner box
38 air intake duct
42 middle cowl
42b air intake passage
54 inner side cowl
54g air intake port
54j protrusion section 55 outer side cowl
85 inner middle cowl
86 outer middle cowl
91 stay

The invention claimed is:

1. A saddled-vehicle having a handlebar steerably supported by a head pipe, a seat configured to support an occupant thereon, and a cowl structure comprising:
   a side cowl that covers a side lower part of the seat;
   a front cowl;
   an air cleaner box provided below the seat and connected to a power unit; and
   an air intake duct for supplying outdoor air to the air cleaner box,
wherein:
   the side cowl includes an inner side cowl and an outer side cowl disposed on a vehicle width direction outer side of the inner side cowl,
   an air intake port for supplying traveling wind to the air intake duct is provided near a front end portion of the inner side cowl, and the air intake port is covered by the outer side cowl from an outer side thereof,
   a side of the head pipe is covered by the front cowl, an air intake passage is formed on an inside of the front cowl, and a rear edge portion of the front cowl is disposed on a front side of the air intake port and further on an outer side than the air intake port, and
   the front cowl is configured to supply a traveling wind, passed through the air intake passage, to the air intake duct via the air intake port.

2. The saddled-vehicle cowl structure according to claim 1, wherein the inner side cowl includes a protrusion section projecting to the outer side, and the protrusion section is provided in a front of the air intake port from a vehicle width direction inner side of a front end portion of the outer side cowl to a part where the inner side cowl is exposed to an outside.

3. The saddled-vehicle having a cowl structure according to claim 2, wherein a main frame extends rearwardly and downwardly from the head pipe, a fuel tank for supplying fuel to the power unit is provided between the head pipe and the seat, the inner side cowl is disposed above the main frame and supported by the fuel tank, and the cowl structure is supported by a stay extending sideways from the main frame.

4. The saddled-vehicle having a cowl structure according to claim 1, wherein a main frame extends rearwardly and downwardly from the head pipe, a fuel tank for supplying fuel to the power unit is provided between the head pipe and the seat, the inner side cowl is disposed above the main frame and supported by the fuel tank, and the cowl structure is supported by a stay extending sideways from the main frame.

* * * * *